(12) United States Patent
Thomas et al.

(10) Patent No.: US 8,801,040 B2
(45) Date of Patent: Aug. 12, 2014

(54) LOW-PROFILE VACUUM TANK TRAILER FOR TRANSPORTING FLOWABLE MATERIAL

(76) Inventors: Timothy Scott Thomas, Henderson, TX (US); Kevin Curbo, Henderson, TX (US)

(*) Notice: Subject to any disclaimer, the term of this patent is extended or adjusted under 35 U.S.C. 154(b) by 12 days.

(21) Appl. No.: 13/507,191

(22) Filed: Jun. 12, 2012

(65) Prior Publication Data

US 2013/0328298 A1    Dec. 12, 2013

(51) Int. Cl.
*B60P 3/24*    (2006.01)

(52) U.S. Cl.
USPC ............ 280/837; 280/838; 280/839; 105/360

(58) Field of Classification Search
USPC .................... 280/837, 838, 839; 105/360
See application file for complete search history.

(56) References Cited

U.S. PATENT DOCUMENTS

| | | | | |
|---|---|---|---|---|
| 814,880 A * | 3/1906 | Speed | ............................ | 105/360 |
| 1,886,197 A * | 11/1932 | Kramer | ......................... | 280/837 |
| RE20,038 E * | 7/1936 | Thwaits | ......................... | 280/837 |
| 2,163,387 A * | 6/1939 | Thwaits | ......................... | 220/653 |
| 2,223,571 A * | 12/1940 | Meyer | ........................... | 280/837 |
| 2,239,442 A * | 4/1941 | Gredell | ......................... | 280/837 |
| 2,362,658 A * | 11/1944 | Meyer | ........................... | 220/562 |
| 3,081,104 A * | 3/1963 | Schmiermann | ............... | 280/837 |
| 3,187,766 A * | 6/1965 | Black | ............................ | 137/267 |
| 3,277,843 A * | 10/1966 | Horner et al. | ................. | 105/360 |
| 3,310,070 A * | 3/1967 | Black | ........................ | 137/637.1 |
| 3,318,485 A * | 5/1967 | Landeborg | ..................... | 222/136 |
| 3,557,708 A * | 1/1971 | Bolte | .............................. | 105/3 |
| 3,883,148 A * | 5/1975 | Miller | ........................... | 280/837 |
| 4,251,005 A * | 2/1981 | Sons et al. | ..................... | 220/563 |
| 4,331,342 A * | 5/1982 | van der Lely | ................. | 280/837 |
| 4,346,905 A * | 8/1982 | Smetanick | ..................... | 280/837 |
| 4,403,783 A * | 9/1983 | Henderson | ..................... | 280/832 |
| 5,782,493 A * | 7/1998 | Bolton et al. | .................. | 280/837 |
| 8,523,232 B2 * | 9/2013 | DeLaRosa et al. | ........... | 280/837 |

* cited by examiner

*Primary Examiner* — Kevin Hurley
*Assistant Examiner* — Michael Stably

(57) ABSTRACT

The present invention discloses a tank trailer for transporting flowable material. The tank trailer includes a low-profile tank having a rear section, a front section, and a transitional section. The transitional section connects the rear section and the front section such that flowable material can flow among the sections. The rear section has a rear circumference and a rear center of gravity. The front section has a front circumference and a front center of gravity. The front circumference is smaller than the rear circumference, and the rear center of gravity is lower than the front center of gravity. The sections have tops that are collinearly aligned. The front section and the transitional section are frameless underneath. The tank trailer also includes a trailer suspension operatively connected to the rear section.

13 Claims, 6 Drawing Sheets

LOW-PROFILE VACUUM TANK TRAILER FOR TRANSPORTING FLOWABLE MATERIAL

TECHNICAL FIELD

The present invention relates to the field of low-profile tank trailers for transporting fluids or other flowable materials either dry and/or liquid.

BACKGROUND ART

Many forms of tank trailers have been devised for transporting flowable materials including liquids and a wide variety of pulverulent and granular solid materials. One such tank trailer has a horizontally disposed substantially cylindrical tank with upwardly inclined ends and plurality of hoppers formed in the bottom of the tank to facilitate the unloading of the tank. The tank is provided on its top with a number of filler openings for loading of the tank. The tank may also be divided into a number of compartments so that each compartment can be loaded and unloaded separately and independently of the other compartments. The inclined or sloping end structure of the tanks facilitates the downward flow of dry and liquid flowable materials when these materials are being unloaded through the hopper bottoms. A suitable frame structure is then attached to each end of the tank at the lower portion thereof so that one frame structure serves as a supporting carriage for wheels and other frame structure is provided with a trailer hitch for connecting the trailer to a tractor.

Previously devised tank trailers are prone to roll over due to a relatively high center of gravity and a relatively narrow frame and wheel-base.

SUMMARY OF INVENTION

The present disclosure concerns low-profile tank trailers for transporting fluids or other flowable materials either dry and/or liquid, with particular emphasis on creating a tank trailer that has a reduced tendency to roll-over due to shifting cargo, imbalanced loads, cornering too quickly, or any combination of the above, including other reasons or causes for roll-overs to occur.

The present disclosure includes low-profile tank trailers for transporting fluids or other flowable materials either dry and/or liquid having a partition within a rear section of the trailer situated within the tank vessel directly above or proximally close to the rear axle of the tank trailer. The placement of this partition can create a cavity within the vessel where no fluid or dry material can enter. The cavity within the vessel may further include devices or openings that causes fluid or dry materials that errantly enter the cavity to be excised or discarded, whether through a pumping device, a drain, or similar mechanism. The positioning of this partition and cavity substantially above the rear axle of the tank trailer provides several benefits, which will be detailed in the description that follows, but briefly include the capability to of a tank trailer to carry a maximum legal load capacity of flowable fluid and/or dry material while maintaining a legal bridging weight distribution across the several axles of the tank trailer and truck while simultaneously lowing the center of gravity of the tank trailer thereby reducing the tendency for the tank trailer to roll-over. These benefits are also achieved even when the tank trailer is not at the maximum legal load capacity and/or only partially full of flowable material.

BRIEF DESCRIPTION OF DRAWINGS

The accompanying drawings, which are incorporated in and constitute a part of this specification, illustrate an implementation of apparatus consistent with the present invention and, together with the detailed description, serve to explain advantages and principles consistent with the invention. In the drawings, FIG. 1 sets forth a drawing illustrating a left perspective view of an exemplary low-profile tank trailer for transporting flowable material according to embodiments of the present invention.

DESCRIPTION OF EMBODIMENTS

Figure 1:
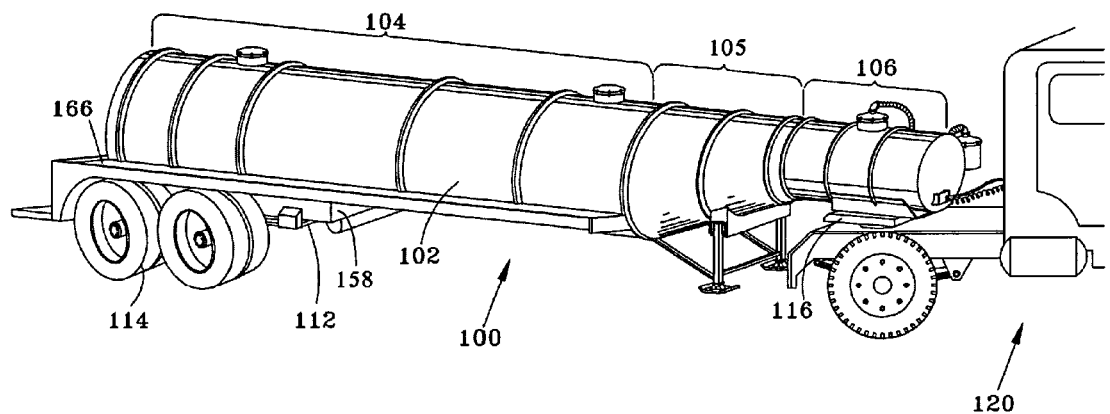

Exemplary embodiments of low-profile tank trailers for transporting flowable material are described herein with reference to the accompanying drawings, beginning with FIG. 1. FIG. 1 sets forth a drawing illustrating a perspective view of an exemplary low-profile tank trailer (100) for transporting flowable material according to embodiments of the present invention. A tank trailer is a semitrailer that has a reservoir for storing flowable materials. A semi-trailer is a type of trailer that does not have a front axle. A large proportion of weight of a semitrailer is supported by a truck, tractor, dolly, or other towing mechanism. Because a semi-trailer does not have a front axle, a semi-trailer is typically equipped with a landing gear (legs which can be lowered) to support the trailer when it is uncoupled.

Flowable materials transported by a tank trailer according to embodiments of the present invention may include fluids or even solids of a size and granularity with respect to the tank that allows the solids, in aggregate, to take on the shape of the tank. Examples of flowable materials may include water, milk, juices, petroleum products, carbon-dioxide, nitrogen, grains, powders, gravel, or any other such materials as will occur to those of skill in the art.

The low-profile tank trailer (100) of FIG. 1 includes a frameless, self-supporting tank (102). The tank (102) of FIG. 1 is an enclosed container with one or more opening for adding and removing the flowable materials. The location of such openings varies from one embodiment to another and typically depends on the type of flowable material being transport by the tank trailer and the method of filling and draining the tank. When gravity is the method used to fill and drain a tank, embodiments typically having an opening at the top of the tank for adding the flowable materials, and another opening at the bottom by which the flowable materials are drained from the tank. In other embodiments where a vacuum or other pump is utilized, the only openings may be located on the bottom of the tank, but there may be other openings as the top of the tank (102) for ventilation purposes. In addition to the openings for allowing the ingress and egress of flowable materials, the tank (102) in the example of FIG. 1 includes three man-hole openings along the top of the tank (102). These man-holes provide access to the interior of the tank (102) during the fabrication process as well as for service and maintenance.

The tank (102) of FIG. 1 may be configured by rolling or bending sheets of metal to form the walls of the tank (102) or by using prefabricated metal cylinders, tubes, or cones. Typically these metal sheets or prefabricated metal components will be welded together or fused in some other manner as will occur to those of skill in the art. Of course, other materials or methods of making tanks useful in low-profile trailers according to embodiments of the present invention as will occur to those of skill in the art may also be useful.

The exemplary tank (102) depicted in FIG. 1 is characterized as "frameless" and "self-supporting." The tank (102) of FIG. 1 is frameless in that the tank (102) is not structurally supported by a full frame that extends longitudinally along the full length of the tank (102). Full frames are typically implemented as beams that extend from the trailer's suspension to the upper coupler and provide a structure on which to attach the tank, but other structural supports may be used to provide other tank trailers with a full frame. The tank (102) of FIG. 1 does not utilize such a full frame. Rather, the exemplary tank (102) of FIG. 1 is structurally supported by the tank's hull, the tank's internal structures, and by various external structures of the tank that circumscribe the tank's hull. Given that a full frame beneath an already large tank takes up a significant amount of space, the frameless, self-supporting nature of the exemplary tank (102) in FIG. 1 allows the tank to sit lower on the exemplary trailer (100) than traditional trailers that utilize a full frame underneath. This frameless, self-supporting tank configuration illustrated in FIG. 1 lowers the center of gravity of the entire exemplary trailer (100) with respect to other traditional trailers.

In FIG. 1, the exemplary tank (102) has a rear section (104) and a front section (106). The circumference of the front section (106) is smaller than the circumference of the rear section (104). Accordingly, the diameter of the front section (106) is smaller than the diameter of the rear section (104). The exemplary tank (102) of FIG. 1 also includes an intervening section (105) connecting the rear section (104) and the front section (106). The intervening section (105) operates as a transitional section between the rear section (104) and the front section (106). The circumference and diameter of the transitional section (105) in FIG. 1 varies from the smaller circumference and diameter of the front section (106) to the larger circumference and diameter of the rear section (104). The transitional section (105) connects to the other sections (104, 106) such that fluid can flow among the sections. That is, fluids can pass from the rear section (104) to the front section (106) through the transitional section (105) and vice versa. These exemplary sections (104, 105, 106) of FIG. 1 connect together along the circumference at their ends forming seams. In the example of FIG. 1, the sections (104, 105, 106) are welded together, but other methods of fabrication may also be useful in exemplary trailers according to embodiments of the present invention.

In FIG. 1, the front section (106) of the tank (102) connects, through a kingpin plate (116), to a truck (120) for hauling the exemplary trailer (100). The rear section (104) of the tank (102) in FIG. 1 connects to a trailer suspension (112), which in turn connects to the ground through a trailer tandem axle connected to various low-profile tires (114). In such a manner, the tank (102) in the example of FIG. 1 is suspended between the trailer suspension (112) and the kingpin plate (116) without, as previously mentioned, the need for a full frame underneath the length of the tank (102) for structural support. Rather, only the rear section (104) has a frame and it is only a partial frame (158) that provides mounting surface for the trailer suspension (112). The front section (106) and the intervening (or transitional) section (105) of FIG. 1, however, are frameless.

In the example of FIG. 1, the rear section (104) has an underside that is lower than the underside of the front section (106). The underside of the front section (106) is sufficiently high to allow the kingpin plate (116) to be mounted underneath the front section (106) and still provide clearance for attaching the exemplary trailer (100) to a truck (120). In the example of FIG. 1, the underside of the rear section (104) is lower than the front section (106) and is situated high enough so as to permit clearance for the trailer suspension (112) and tires (114) underneath. The configuration depicted in FIG. 1 ensures that the center of gravity for the rear section (104) is lower than the center of gravity for the front section (106) and produces an overall center of gravity for the exemplary trailer (100) that is approximately twenty inches lower than traditional trailers, which typically use a cylindrical tank having a single diameter mounted above the kingpin plate.

While lowering a substantial portion of the rear section beneath the kingpin plate advantageously lowers the exemplary trailer's overall center of gravity, the exemplary trailer (100) of FIG. 1 is designed such that a portion of the tank (102) is positioned over the kingpin plate (116) via the front section (106). This configuration moves the center of gravity for the exemplary trailer (100) closer toward the front of the trailer than it would otherwise be without the front section. The advantage of this configuration is that the weight of the front section (106), especially when loaded, assists the exemplary trailer (100) in bridging with the truck (120). The term "bridging" refers to the transfer of weight from the trailer onto the fifth wheel of the truck or other hauling device. Trailers in which the center of gravity is not far enough toward the front of the trailer do not bridge well with the truck—that is, not enough of the trailer's weight gets transferred to the fifth wheel of the truck. These trailers are difficult and more dangerous to haul because they do not transfer enough weight to the truck's suspension under the fifth wheel to provide good traction with the highway.

The exemplary trailer (100) of FIG. 1 is designed to comply with all applicable laws and regulations concerning the use of such trailers. In particular, the exemplary trailer (100) is designed to ensure compliance with the gross weight limitations promulgated by the U.S. Department of Transportation ("DOT") for the operation of such trailers on the Interstate Highway System. These DOT regulations require that the gross weight of a semitrailer and the truck to which it is attached not exceed 80,000 pounds. Further, these DOT regulations require that the weight be distributed across the axles in a manner not to exceed the following limits: 12,000 pounds for the truck's steer axle; 34,000 pounds for the truck's tandem axles; and 34,000 pounds for the trailer's tandem axles. With the purchase of an additional endorsement, the gross weight limit may be increased to 84,000 pounds and the limits on the weight distribution changes as follows: 12,600 pounds for the truck's steer axle; 35,700 pounds for the truck's tandem axles; and 35,700 pounds for the trailer's tandem axles.

The tank (102) of the exemplary trailer (100) depicted in FIG. 1 is designed to carry at least 130 barrels of fluids, each barrel being equivalent to forty-two gallons. When the tank (102) is filled to its 130 barrel capacity with water, the exemplary trailer (100) and the connected truck (120) of FIG. 1 have a gross weight that does not exceed 84,000 pounds. The gross weight of the truck (120) and exemplary trailer (100) of FIG. 1 is distributed such that no more than 12,600 pounds is applied to the truck steer axle, no more than 35,700 pounds is applied to the truck tandem axles, and no more than 35,700 pounds is applied to the trailer tandem axles.

These weight distribution limits place corresponding limits on the length and diameter of the exemplary trailer (100) of FIG. 1. For example, the 34,000 pound limit on the trailer tandem axles limits the number of combinations of tank length and diameter for the rear section that would allow the exemplary trailer (100) of FIG. 1 to comply with DOT regulations. The larger the diameter of the rear section (104) at a particular length or the longer the length of the rear section (104) at a given diameter, the more weight that will shift off of the truck tandem axles onto the trailer tandem axles. Accordingly, the rear section (104) of FIG. 1 must be sufficiently short to ensure that enough of the tank's capacity is designed into the front section (106) and the transitional section (105) so that the weight on the trailer's tandem axles does not exceed 34,000 pounds. Because the front section (106) and the transitional section (105) are smaller than the rear section (104), the overall diameter of the various sections must be sufficiently large to contain the minimum capacity used in the industry, which in the example of FIG. 1 is 130 barrels of fluid.

In FIG. 1, the trailer (100) includes a hose tray (166) mounted longitudinally along a bottom, lateral portion of the rear section (104). The hose tray (166) is lower than the underside of the front section (106) and extends along the entire length of the rear section (104) in the example of FIG. 1. The width of the hose tray (166) of FIG. 1 extends from the tank (102) outward past the tires (114) to cover the top of the tires (114), but not so far as to make the exemplary trailer (100) wider than permissible under certain laws or regulations promulgated by the authorities governing trailer width for trailers used in commerce or society. Such authorities may include, for example, a local, state, or federal government's department of transportation, public safety, highway administration, or any other such agency as will occur to those of skill in the art. The dimensions of the hose tray (166) in FIG. 1 are for explanation only and not for limitation. One of skill in the art will recognize that a hose tray may extend along the entire length of the rear section or may only extend along a portion of that length and may be configured using a variety of widths.

Because the hose tray (166) of FIG. 1 is lower than the underside of the front section (106), the hose tray (166) of FIG. 1 considerably lower than the hose trays of traditional trailers. In such a manner, exemplary trailer (100) allows a truck operator to easily access the hose tray (166) at the level of the operator's torso while standing on the ground. The configuration in the example of FIG. 1, therefore, provides more convenient and safer access to hoses stored on the hose tray (166) than in traditional trailers in which the hose trays are often located at or above the operator's head.

The exemplary trailer (100) of FIG. 1 includes a trailer suspension (112) that is operatively connected to the rear portion of the underside of the rear section (104). The trailer suspension (112) of FIG. 1 is the system of cylinders, springs, shock absorbers, and/or other linkages that connects the trailer (100) to its axles and wheels. The trailer suspension (112) in the example of FIG. 1 is a low-ride trailer suspension. Generally, the lower that a trailer suspension allows the tank (102) of the exemplary trailer (100) to be position, the lower the center of gravity for the entire tank (102). Therefore, smaller trailer suspensions may be preferred provided that those smaller suspensions can support the weight of the exemplary trailer (100) for purposes of transporting a full load of flowable material. For explanation only, and not for limitation, an example of a trailer suspension useful in a low-profile tank trailer according to embodiments of the present invention may include the Watson & Chalin TA300 Air Ride Suspension with a 60K rating. The trailer suspension (112) of FIG. 1 connects to an axle, which in turn, connects to a set of wheels and tires. For explanation only, and not for limitation, examples of an axle useful in a low-profile tank trailer according to embodiments of the present invention may include Watson & Chalin axles with a 25K rating, ⅝" wall, 77.5" track, and outboard drums. Exemplary wheels and tires useful in a low-profile tank trailer according to embodiments of the present invention may include 10-hole steel disk hub piloted wheels and 255/70 R22.5 (H) low-profile tires.

The exemplary trailer (100) of FIG. 1 is primarily made of metal—specifically, steel. One of ordinary skill in the art, however, will recognize that other materials may also be useful in or substituted for steel in low-profile tank trailers according to embodiments of the present invention. Such other materials may include aluminum, galvanneal, fiberglass, carbon-fiber, or any other materials as will occur to those of skill in the art. These other materials may require more or less structural supports inside the tank or around the circumference of the tank's hull depending on the overall structural integrity of a tank configured from these other materials.

Figure 2:
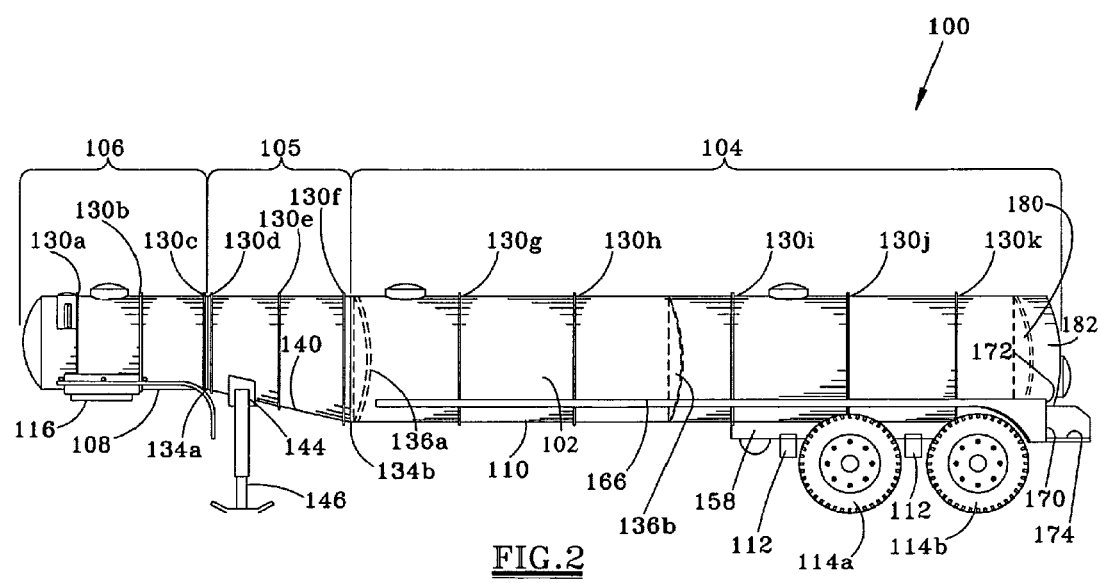
FIG. 2 sets forth a drawing illustrating a right orthogonal view of the exemplary low-profile tank trailer for transporting flowable material according to embodiments of the present invention.

Turning to FIG. 2 for further explanation of an exemplary low-profile tank trailer, FIG. 2 sets forth a drawing illustrating a right orthogonal view of the exemplary low-profile tank trailer (100) for transporting flowable material according to embodiments of the present invention. The low-profile tank trailer (100) of FIG. 2 includes a frameless, self-supporting tank (102) having a rear section (104), a front section (106), and an intervening section (105). The intervening section (105) of FIG. 2 connects the rear section (104) and the front section (106).

FIG. 2 depicts the front section (106) having a front section underside (108) and the rear section (104) having a rear section underside (110). The front section underside (108) in FIG. 2 is higher than the rear section underside (110), and as a corollary, the rear section underside (110) is lower than the front section underside (108). The topsides of all the sections (104, 105, 106) in the example of FIG. 2 are aligned longitudinally along the length of the tank (102). In this manner, the front section (106), the transitional (or intervening) section (105), and the rear section (104) have tops that are collinearly aligned. As previously mentioned, this configuration lowers the center of gravity of the entire trailer (100) in FIG. 2 compared to traditional trailers, typically by as much as twenty inches.

The tank (102) in the example of FIG. 2 is characterized as a "frameless, self-supporting" tank. From FIG. 2, one of skill in the art would recognize that there is no full frame extending longitudinally along the tank (102) to provide structural support. Rather, the structural support for the tank comes from the tank itself, including the tank's internal structures, and in the embodiment of FIG. 2, the tank's external structures around the circumference of the hull of the tank (102). While FIG. 2 depicts the use of these internal structures and external structures around the tank's circumference, other embodiments of the low-profile tank trailers according to embodiments of the present invention may not utilize such internal or external structures. Rather, other embodiments of the low-profile tank trailers according to embodiments of the present invention may rely only on the structural support provided the tank wall itself.

Because the tank (102) in the example of FIG. 2 is frameless, the tank (102) of FIG. 2 includes a plurality of stiffener rings (130) to structurally reinforce the tank (102). Each stiffener ring (130) in the example of FIG. 2 is mounted along an exterior perimeter of the tank (102) at various locations aft of the front wall of the front section (106). In the example of FIG. 2, the stiffener rings (130c, 130d) are mounted adjacent to the seam (134a) formed between the front section (106) and the intervening section (105) of the tank (102) to reinforce the structural integrity of the tank (102) at that joint. Similarly, the stiffener ring (130f) is mounted adjacent to the seam (134b) formed between the intervening section (105) and the rear section (104) of the tank (102) to reinforce the structural integrity of the tank (102) at that joint. Each of the stiffener rings (130) in the example of FIG. 2 may be made from metal strips that are hard-rolled lengthwise along the smaller edge. One of skill in the art, however, will recognize that other materials or methods of making stiffener rings useful in low-profile trailers according to embodiments of the present invention may also be useful.

In the example of FIG. 2, the tank (102) also includes two baffles (136). Each baffle (136) of FIG. 2 is mounted along an interior perimeter of the tank (102) and spans an interior region of the tank (102). The baffles (136) in the example of FIG. 2 dampen the movement of the flowable material stored inside the tank (102) that typically occurs when the low-profile tank trailer (100) is being hauled. In addition to dampening the movement of the flowable materials, the baffles (136) also serve to reinforce the structural integrity of the tank (102). In the example of FIG. 2, the baffle (136a) is mounted adjacent to the seam (134b) formed between the intervening section (105) and the rear section (104) to reinforce the structural integrity of the tank (102) at that joint. Each of the baffles (136) in the example of FIG. 2 may be made from plates of metal cut to fit within the inside perimeter of the tank (102). Baffles made from such plates typically have holes or slots cut to allow the flowable material to move from one side of the baffles to the other, thereby dampening the movement of the flowable material as compared to the movement without such baffles. One of ordinary skill in the art, however, will recognize that other materials or methods of making baffles may also be useful in low-profile trailers according to embodiments of the present invention.

To ensure that the trailer (100) rests as low to the ground as possible, the trailer (100) of FIG. 2 includes a low-ride trailer suspension (112) operatively connected to the rear portion of the rear section underside (110). While FIG. 2 does not depict the entire trailer suspension (112), one of ordinary skill in the art will recognize that the suspension includes the system of cylinders, springs, shock absorbers, and/or other linkages that connects the exemplary trailer (100) to its axles and wheels such as, for example not limitation, the Watson & Chalin TA300 Air Ride Suspension with a 60K rating. The trailer suspension (112) of FIG. 2 connects to the rear section underside (110) through a tank substructure (158) mounted on top of the suspension (112). The rear section (104) of the tank (102) in FIG. 2 is then mounted to the tank substructure (158). In this way, the tank substructure (158) of FIG. 2 serves as an interface that bridges the underside (110) of the rear section (104) with the trailer suspension (112).

In the example of FIG. 2, the trailer (100) also includes a plurality of low-profile tires (114) operatively connected to the trailer suspension (112). The low-profile tires (114) connect to the trailer suspension (112) through set of axles and wheels. The low-profile nature of the tires (114) provides the trailer (100) with a lower center of gravity than tires with larger side walls and therefore larger diameters. One of ordinary skill in the art, however, will recognize that even the use of standard-profile tires may still be useful in certain low-profile trailers according to embodiments of the present invention given that the configuration of the frameless, self-supporting tank by itself sufficiently lowers the center of gravity of a trailer according to embodiments of the present invention to provide greater stability and safety than traditional trailers.

The exemplary trailer (100) of FIG. 2 includes a kingpin plate (116) connected to the front section underside (108). The kingpin plate (116) of FIG. 2 connects to the front section underside (108) through a front section substructure that mounts to the surface of the front section underside (108) and the upper surface of the kingpin plate (116). A kingpin plate is a load bearing surface on the underside of the front of a semitrailer. The kingpin plate typically rests on the fifth wheel of a truck, tractor, dolly, or other hauling mechanism and has a downward-protruding kingpin which is captured by the locking jaws of the fifth wheel. Another common term for a kingpin plate is an "upper coupler." In the example of FIG. 2, the kingpin plate (116) has a kingpin (not shown) for attaching the trailer (100) to a truck (not shown). In the example of FIG. 2, a portion of the front section (106) extends in front of the kingpin plate (116) to ensure that enough weight, when the trailer (100) is loaded, is transferred through the kingpin plate (116) to the rear truck axles for bridging purposes.

In FIG. 2, the kingpin plate (116) includes several drip holes (not shown) at a lower, rear portion of the kingpin plate (116) for expelling any liquids, such as rain or water on the road, that may accumulate in the kingpin plate (116). These drip holes allow water or other liquids to escape that may have accumulated inside the kingpin plate (116), which is often formed from two plates connected together with a hollow cavity there between for adding additional structural support. The drip holes may be created by drilling through the wall of the kingpin plate (116) into its inner, hollow cavity. Other methods of forming drip holes in the kingpin plate (116) as will occur to those of skill in the art may also be useful.

In some embodiments, an exemplary trailer according to embodiments of the present invention may need to adjust the position of the load in the tank to assist the exemplary trailer in bridging with a truck. In such embodiments as depicted in FIG. 2, the tank (102) may include an empty compartment (182) that can be sealed off from the rest of the tank (102) using a partition (180). The empty compartment (182) in such embodiments remains empty even while the remainder of the tank (102) is filled up with the flowable material, thereby reducing the density of the rearward region of the tank (102). In this manner, the center of gravity for the tank (102) of FIG. 2 is shifted further toward the front of the tank (102) than it would otherwise be without the empty compartment (182).

The further that the center of gravity is shifted toward the front of the trailer (100) of FIG. 2, the more weight from the trailer (100) will be transferred through the kingpin plate (116) to the tractor, truck, or other hauling device.

Although in enhancing the bridging characteristics of the exemplary trailer (100) of FIG. 2, the addition of the empty compartment may reduce tank volume used for transporting the flowable material. If a particular tank volume is important for an application in which the trailer is used, the loss in tank volume may be accommodated by increasing the circumference or the length of the tank (102) in one or more section (104, 105, 106). Readers will note, however, that embodiments having a partition and empty compartment are for example only, not for limitation. Other embodiments of exemplary trailers according to the present invention may not utilize such partitions and empty compartments.

In the example of FIG. 2, the empty compartment (182) is formed by a partition (180) that separates the empty compartment (182) from the rest of the tank (102). The partition (180) of FIG. 2 is mounted along an interior perimeter of the tank (102) and spans an interior region of the tank (102). The partition (180) in the example of FIG. 2 blocks the flow of the flowable material into the empty compartment (180). In addition to sealing off the empty compartment (182), the partition (180) in the example of FIG. 2 also serves to reinforce the structural integrity of the tank (102). The partition (180) in the example of FIG. 2 may be made from plates of metal cut to fit within the inside perimeter of the tank (102). One of ordinary skill in the art, however, will recognize that other materials or methods of making a partition may also be useful in low-profile trailers according to embodiments of the present invention.

In the example of FIG. 2, the empty compartment (182) is formed at the rearmost portion of the tank (102) using a single partition (180) and the tank's rear wall. One of skill in the art will recognize that the further rearward that the empty compartment is placed, the more that the trailer's center of gravity will be shifted toward the front of the trailer, thereby transferring more of the trailer's weight to tractor through the kingpin plate. However, the shape and placement of the empty compartment (182) in FIG. 2 is for explanation only and not for limitation. The empty compartment in other embodiments of the present invention may be implemented using multiple partitions such that the empty compartment is formed closer to the rear tandem axles of the trailer (100). This configuration would allow the flowable material to fill up the tank on both sides of the empty compartment. The empty compartment could be designed such that it did not extend all the way to the bottom of the tank (102), thereby allowing the flowable material to pass from one side of the empty compartment to the other. One of skill in the art will recognize other configurations for the empty compartment that may be useful in low-profile tank trailers according to embodiments of the present invention.

Because the low-profile tank trailer (100) in the example of FIG. 2 does not have a front axle, the trailer (100) of FIG. 2 includes a landing gear (146). The landing gear (146) of FIG. 2 is composed of two jacks that are coupled together. The landing gear is used to lift the front of the low-profile tank trailer (100) up so that a truck can be driven under the front section (104) and hitched up at the kingpin plate (116). Once hitched up, the landing gear (146) is raised to its stowed position for traveling.

The landing gear (146) of FIG. 2 is mounted to a junction box (144), which in turn is mounted to an underside of the intervening section (105). The junction box (144) of FIG. 2 is a container for housing electrical connections. The junction box (144) of FIG. 2 not only serves to conceal the electrical connections from sight, but also operates to deter tampering. Although not shown, the junction box (144) of FIG. 2 includes one or more drip holes at a lower, rear portion of the junction box (144) for expelling any liquids, such as rain or water on the road surface, that may accumulate in the junction box (144). Similar to the drip holes in the kingplate, the drip holes may be created by drilling through the lower portion of the rear wall of the junction box (144) or the rear portion of the bottom wall of the junction box (144) to expose the inner cavity of the junction box (144) to the outside environment. Other methods of forming drip holes in the junction box (144) as will occur to those of skill in the art may also be useful.

One of ordinary skill in the art will recognize that many trailers are subject to certain laws or regulations promulgated by the authorities governing their use in commerce or society. Under such regulations, trailers are often limited to a certain maximum weight or size. To reduce the weight of the trailer (100) in the example of FIG. 2 so that the exemplary trailer (100) can transport a larger quantity of flowable material, the rear portion of the rear section (104) has a thinner tank wall than the front portion of the rear section (104). The difference in thickness will often depend on the fabrication techniques used to create the tank (102). For example, if the tank (102) of FIG. 2 was created using rolled sheets of metal of a particular thickness, the thinner rear portion of the rear section (104) could be made using sheets of metal having the next smaller commercially available thickness. Such thinner sheets could be used provided of course that such thinner sheets did not diminish the structural integrity of the tank (102) of FIG. 2 beyond an acceptable level in effort reduce the weight of the exemplary trailer (100).

In the example of FIG. 2, the tank (102) extends for a length sufficient to permit the tank (102) to store an industry-standard quantity of flowable material. The industry-standard quantity represents a commercially available amount that one can typically order when requesting delivery of a flowable material by trailer. For example, within the industry of vacuum trailers, an industry-standard amount may be 130 barrels. For other tank trailer industries, however, an industry-standard quantity may be different and may be measured in different units. To ensure that the tank (102) of FIG. 2 provides sufficient volume to store an industry-standard quantity without raising the center of gravity for the entire trailer (100), the rear section (104) may be designed using any industry standard diameter and then extend longitudinally in the rear direction for a sufficient length to create the volume need to store an industry-standard amount. In FIG. 2, therefore, the tank volume sacrificed by raising the underside (108) of the front section (106) to provide clearance for the fifth-wheel of a truck is added to the rear section (104) of the tank (102) so that the exemplary trailer (100) may still be used to transport an industry-standard quantity. One of skill in the art will recognize that the smaller the tank diameter that is used in the various sections of the tank, the longer the tank (102) of FIG. 2 must be extended in the rearward direction to allow the tank to store an industry-standard quantity of flowable material. Conversely, the larger the tank diameter that is used, the shorter the tank must be extended in the rearward direction to allow the tank (102) of FIG. 2 to store an industry-standard quantity of flowable material. The larger the tank diameter that is used, however, the higher the overall center of gravity will be for the exemplary trailer (100) of FIG. 2.

In the example of FIG. 2, the low-profile tank trailer (100) includes two hose trays (166) mounted longitudinally along a bottom, lateral portion (168) of the rear section (104). The hose trays (166) of FIG. 2 are platforms on which hoses or other items may be stowed for transporting when not in use. One hose tray (166) is on the right side of the exemplary trailer (100), which is depicted in FIG. 2. The other hose tray (not shown) is on the left side of the exemplary trailer (100) and is not visible in FIG. 2. The example of FIG. 2 clearly depicts how the hose trays (166) are lower than the front section underside (108) of the tank (102). As previously mentioned, this configuration allows a truck operator to easily access the hose tray (166) at the level of the operator's torso while standing on the ground, which is more convenient and safer than in traditional trailers in which the hose trays are often located at or above the operator's head.

The exemplary trailer (100) of FIG. 2 also includes rear walls (170) for mounting rear signal indicators such as breaking and turning signal lights. The rear walls (170) of FIG. 2 are fabricated from sheets of metal, but other materials, such as fiberglass or carbon-fiber, as will occur to those of skill in the art may also be used. The rear walls (170) are aligned vertically with respect to the hose trays and connect to the rear ends (172) of the hose trays (166). The rear walls (170) in the example of FIG. 2 extend downward toward ground level for a length sufficient to provide a mounting surface for the rear signal indicators and for a set of rear platform. One of skill in the art will recognize, however, that the length of the rear walls (170) may vary from one embodiment to another and that the length depicted in FIG. 2 or described with reference thereto is for explanation only and not for limitation.

In the example of FIG. 2, the exemplary trailer (100) includes rear platforms (174) extending horizontally from the rear walls (170). The rear platforms (174) of FIG. 2 are configured from a metal mesh to avoid the accumulation of liquids and debris. In other embodiments, however, the rear platforms may be configured from metal plates with perforations, solid metal plates, or even other materials as will occur to those of skill in the art. In the example of FIG. 2, the rear platforms (174) are configured lower than the hose trays (166). The configuration depicted in FIG. 2 facilitates the ability of a truck operator to step up on the rear platforms (174) without the assistance of a ladder or additional steps. From the rear platforms (174), the truck operator may further scale the exemplary trailer (100) by stepping up on the hose trays (166) without the assistance of a ladder. By eliminating the need for a ladder, the configuration of FIG. 2 improves safety and convenience over traditional trailers. Such ladders or steps, however, may be provided for in some embodiments for additional expediency.

Previous tank trailer designs, including those designs disclosed in Provisional application Ser. No. 12/646,675 filed Dec. 23, 2009, and Non-Provisional application Ser. No. 12/924,071 filed Sep. 20, 2010, could be built using high tensile strength steel, specifically A572-65, exclusively for the tank trailer's front and rear sub-frame areas. Theoretically, one could substitute a thinner plate of high tensile strength steel in lieu of a thicker normal tensile strength steel, such as A36, without compromising structural integrity. The benefit that would be achieved is the reduction of overall weight of the tank trailer. However, in practice this substitution does not work. Tank trailers of the current embodiment were manufactured with the thinner steel, it was found that while the steel was stronger, it was also more brittle than the thicker normal tensile strength steel. This brittle nature of the thinner plates of high tensile strength steel caused the steel plates to crack and split when put under excessive force, such as when the plate is being machined with a brake press.

To overcome the weakness of thinner high tensile strength steel, the present application achieves a better result by using thicker normal tensile strength steel, such as A36. To offset the additional weight of using a thicker and heavier plate of steel, the components produced from the thicker, heavier plate of steel can be 1) reducing the overall size of the component; 2) re-shaping the component; 3) removing excessive material from the component (holes, dimples, ovals, notched corners) and/or 4) removing the component from the design altogether. The present design achieves this weight reduction through the above methods while using thicker normal tensile strength steel while maintaining the structural integrity of the sub-frame component areas.

Another improvement of the currently disclosed tank trailer over previous tank trailer designs comes with the design and placement of a catwalk and guardrail assembly. Original designs such as those in Provisional application Ser. No. 12/646,675 filed Dec. 23, 2009, and Non-Provisional application Ser. No. 12/924,071 filed Sep. 20, 2010, included catwalk and associated guardrails that extended from the rear of the tank trailer towards the front of the trailer, usually these catwalks and associated guardrails were approximately 28 feet in length, this approximately length was chosen for these previous designs as the curvature of the vessel or tank made it prohibitive to extend the length any farther. Additionally, the previous designs had to include catwalks and associated guardrails that were shorter than the overall length of the tank trailer because of the weight limitations suffered by these previous tank trailer designs. This lack of a full length catwalk and associated guardrails imposed hardships and hazards to the users of the tank trailer, as routine maintenance of the vessel or tank becomes extremely difficult without a normal catwalk and guardrail assembly, especially in wet or icy conditions.

The present application and disclosure over comes these previous shortfalls by extending the catwalk and guardrail assemblies substantially the full length of the tank trailer. To compensate for the additional weight of a full length cat walk, the present disclosure and certain embodiments of the present application can do one or more of the following actions to achieve this reduction in weight: 1) lowering the overall height of the guardrails, 2) removing one or more horizontal crosspieces, 3) reducing the size of the kick plate, and/or 4) redesigning the catwalk supports and using a thinner and lighter weight construction material.

Another often-fought issue with previous trailer designs is that of bridging weight. Federal, state, and local laws, regulations and ordinances require certain weights and length guidelines. Some jurisdictions allow for overweight load permits. Previous tank trailer designs failed to meet the bridging weight guidelines when loaded with cargo. As an example, the gross weight limit could be 84,000 pounds being distributed as 37,400 pounds on the trailer tandem, 37,400 pounds on the truck drive axles, and 13,200 pounds on the truck steer axle. The gross vehicle weight under this scenario should not exceed 84,000 pounds. In addition to the overall weight limit, the particular axles must distribute as outlined above so that at any point the weight limits are not exceeded for a certain axle and/or section of the tank trailer and tractor.

Ways of overcoming previous tank trailer failings, such as achieving a legal bridging weight, include increasing the diameter of the vessel or tank and installing dummy or hollow compartments in the rear half of the vessel or tank. This in theory displaces a certain volume of fluid (or dry cargo) and its associated weight from residing above the rear tandem axle thus balancing the load to allow for a legal bridging weight. Care must be taken not to overly enlarge the size or volume of the vessel or tank as it can lead to a failure point and be structurally unsound.

Figure 2A:
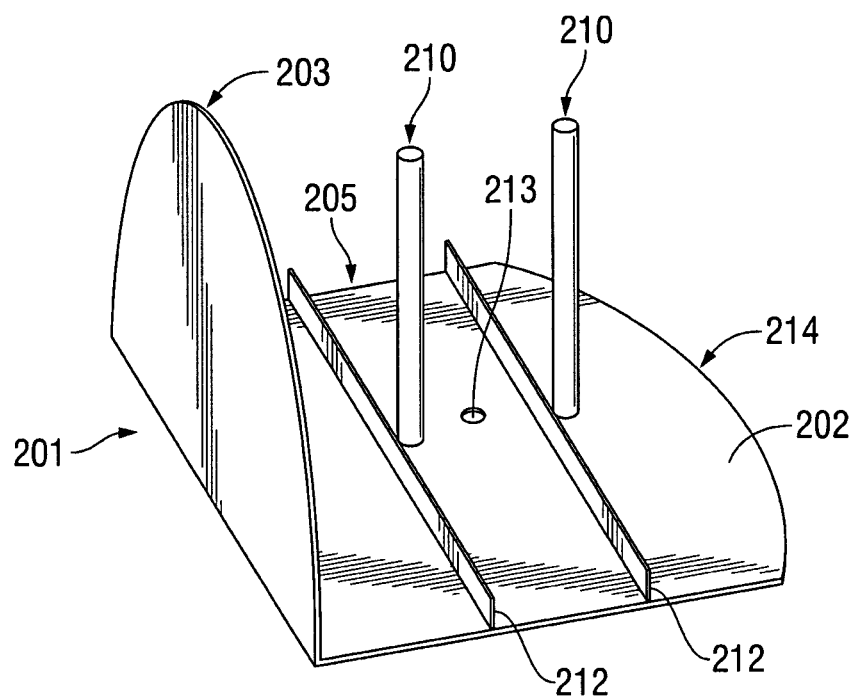
FIG. 2A sets forth a drawing illustrating a first embodiment of a first embodiment of an exemplary partition that may be fitted within a rear portion of a low-profile tank trailer for transporting flowable material according to the embodiments of the present invention.

As an example, a tank trailer was manufactured to incorporate a partial dummy compartment in the rear portion of the vessel to produce a main portion of the vessel for storage of cargo and/or fluid and a void wherein cargo and/or fluid would not be stored in order to gain weight distribution advantages. The walls of the dummy compartment were composed of ¼" steel and internally braced with ¼"×2"×2" angle iron. The dummy compartment was designed as a half cylinder and was attached via welds to the inner surface of the cylindrical vessel, see FIG. 2A for an exemplary embodiment of the partition (180) from FIG. 2. It can be appreciated that in FIG. 2A, the forward vertical wall (201) is a semi-circle with a radius that is half the internal diameter of the vessel. The forward vertical wall (201) is adjoined to the lower floor (202), through means known in the art such as welding or fasteners that provide a seal to prevent leaks through the adjoining seam. This combination of the forward vertical wall (201) and lower floor (202) is then affixed to the inner surface of the vessel, preferably over the rear axle, but may of course be positioned at the front of the vessel. The combined forward vertical wall (201) and lower floor (202) are positioned as such to create a void in the upper, rear portion of the vessel, wherein upper edge (203) adjoins the inner circumferential surface of the vessel, side edges (205) adjoin the inner side surfaces, preferably at the midpoint of the vessel's vertical height, and rear edge (204) adjoins the rear inner surface of the vessel. This design allows flowable product to extend the full length of the vessel, including over the rear tandem axles, until the product reaches a depth exceeding half the height of the vessel wherein the product would be displaced by the half cylinder dummy compartment leaving a void above the rear tandem axle. See FIG. 2A. In real world test and applications of the example tank trailer, the flat surfaces of the dummy compartment did not withstand the pressures, both positive and negative, applied to the vessel during normal operating procedures. When a pressure was applied to the vessel, it caused the flat surfaces of the dummy compartment to flex, often as much as one to two inches of flex. This continued flexing when under pressure resulted in the angle iron supports breaking in half, weld seams splitting, and tearing of the vessel wall itself. The failing of the dummy compartment of the current example failing resulted in even further issues such as the need to extricate leaked fluid and/or cargo from the dummy compartment, which was inaccessible in the above example. To overcome these deficiencies the next iteration included internal reinforcements, such as vertical supports (210) and/or horizontal bracings (212) to prevent the flat surfaces from flexing as well as drain couplings (213) and plugs (not shown) to aid in the removal of leaked fluid and/or cargo from the dummy compartment in the event the contents leaked through a breach in the dummy compartment, as shown in FIG. 2A.

The results of the above mentioned improvements to the structure of the dummy compartment in tests revealed that the flat surfaces has a reduced tendency to flex, but this new rigidity transferred additional stresses to the vessel walls above the flat surfaces. After a period of time, these new stresses would result in one or more failures of the vessel wall leading to an external breach and leak of the vessel itself causing a loss of product (fluid and/or cargo), environmental damage, damage to the tank trailer, among many other potential problems. It was discovered that in addition to the stress induced breaches that the internal compartment design had a basic flaw: it had no factor or benefit if the tank trailer was not fully loaded. This version of the tank trailer made an assumption that the tank trailer vessel would be full with approximately 130 BBL (5460 U.S. gallons) of product (fluid and/or cargo). By blocking or introducing the dummy compartment to make a void in the rear portion of the vessel having a volume of approximately 500 U.S. gallons one can shift the tank trailer's center of gravity forward thus reducing the weight on the rear axle(s) and allowing for a legal weight. However, this scenario only worked when the product weighed less than 9.5 pounds per U.S. gallon. Many operators haul drilling mud, among other known fluids, with a weight in excess of 9.5 pounds per U.S. gallon, sometimes even more than 17 pounds per U.S. gallon. When this situation occurs, the operators will only haul a limited volume of product so as not to exceed the overall weight limits of 84,000 pounds. The circumstance of loading product that was heavier than 9.5 pounds per gallon results in having the same initial problem sought to be overcome with the half cylinder dummy compartment, too much weight over the rear tandem axles causing the tank trailer to fail the bridging and weight requirements even when under the maximum overall weight limits.

Figure 2B:
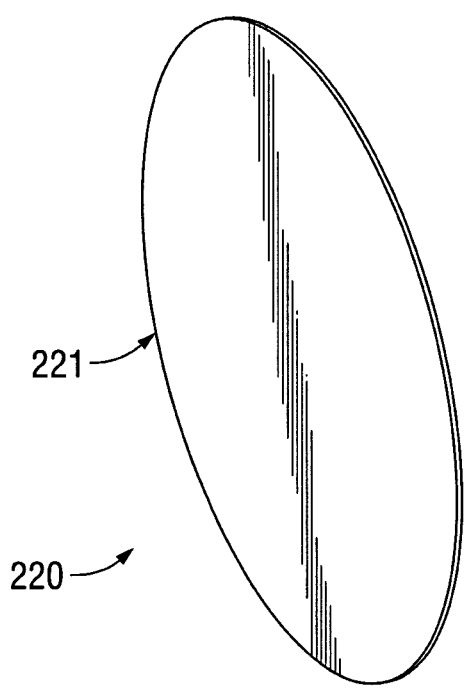
FIG. 2B sets forth a drawing illustrating a second embodiment of an exemplary partition that may be fitted within a rear portion of a low-profile tank trailer for transporting flowable material according to the embodiments of the present invention.

FIG. 2B shows a preferred embodiment of the partition (180) from FIG. 2, wherein the partition (180) is embodied as a substantially circular disc (220). The edge (221) is affixed to the inner surface of the vessel (not shown) through means known in the art, such as, welding or fasteners, so that flowable product is not allowed through the seam between edge (221) and the inner surface of the vessel (not shown). In a preferred embodiment the interior diameter of the vessel was 64 inches, another preferred embodiment had an internal diameter of 67 inches, as such the diameter of the substantially circular disc (220) had a substantially matching diameter and is then fixedly attached, via welding, 30 to 33 inches, respectively, from the rear of the vessel. This placement and shape of the partition (180) provides a void in the rear portion of the vessel, preferably above the rear axle, thus achieving a proper bridging weight, as described herein. It should be understood that the internal and/or external geometry of the vessel and the partition (180) can take myriad shapes or configurations, such as rhomboids, ovals, or circles, and that the preferred embodiment is for illustration and not limitation.

As shown in exemplary FIGS. 1 and 2, an example of a low-profile tank trailer built in accordance with the accompanying disclosure lowered the industry standard overall height from approximately 116 inches to 96 inches, a reduction of 20 inches or 17%. The benefits realized from this disclosure include improved driver visibility around and over the top of the low-profile tank trailer, as well as reducing wind drag. The example low-profile tank trailer built in accordance with the accompanying disclosure also lowered the center of gravity, over the industry standard, from 86 inches to 62 inches, a reduction of 24 inches or 28%. Just one of the benefits realized from this new low-profile disclosure is a less "top-heavy" tank trailer and thereby less prone to roll over incidents. The axle width of an example low-profile tank trailer built in accordance with the accompanying disclosure includes an axle width of 77.5 inches to widen the tank trailer to the maximum legal width of 102 inches. The benefit realized through this widening of the tank trailer frame and base causes an improved stability for the tank trailer. Due to the widened frame and lowered center of gravity, the force necessary to cause a roll-over of the tank trailer is significantly increased, thereby reducing the possibility of a roll-over. Other inclusions in the example low-profile tank trailer includes relief valves such as 1.5 inch vacuum relief, 2 inch pressure relief both located on the front and top of the vessel body. Additional relief valves include a 2 inch pressure relief line (blowdown) at the rear of the vessel body as well as a 2.5 inch +30/−30 liquid filled pressure gauge. Further inclusions that can be incorporated into a low-profile tank trailer consistent with the present disclosure include: manways, such as a 20 inch domed style manway with plated swing bolts and wing nuts; shut-off valves, such as an 8 inch stainless primary and 10 gallon secondary (moisture trap); lighting components, such as full DOT sealed LED lights, junction boxes, overhead work lights and switches located at various points on the low-profile tank trailer; sight glass, such as a 1.5 inch OD acrylic tube installed in the rear head of the tank trailer, 1.5 inch shutoff ball valves, and a ¾ inch drain. A top load line can also be included to reduce loading time through the elimination of head pressure and elimination of a backing trailer to supply in some cases and also reduces the length of hoses for hookups.

Figure 3:
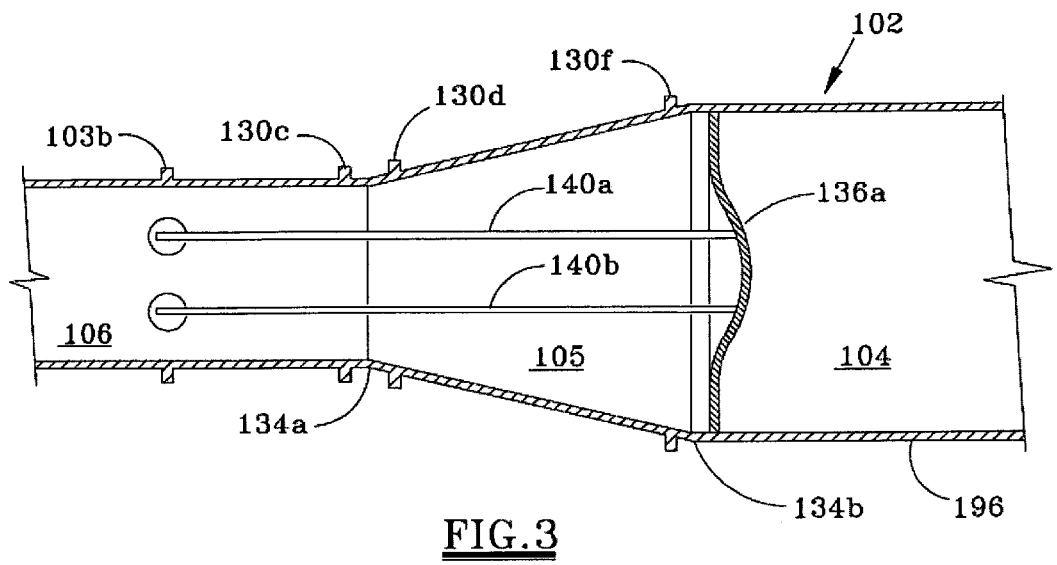
FIG. 3 sets forth a drawing illustrating a cross-section of a top orthogonal view of the frameless, self-supporting tank in the exemplary low-profile tank trailer according to embodiments of the present invention at the midpoint of the tank.

For further explanation of the internal structural supports that enhance the structural integrity of the frameless, self-supporting tank (102) in the example of FIG. 2, FIG. 3 sets forth a drawing illustrating a cross-section of a top orthogonal view of the frameless, self-supporting tank (102) in the exemplary low-profile tank trailer according to embodiments of the present invention at the midpoint of the tank (102).

The tank (102) in the example of FIG. 3 has a rear section (104), a front section (106), and an intervening section (105) connecting the rear section (104) and the front section (106). Although not depicted in the view of FIG. 3, the front section (106) has a front section underside (not shown), and the rear section (104) has a rear section underside (not shown). The rear section underside is lower than the front section underside. Accordingly, the center of gravity for the rear section (104) is lower than the center of gravity for the front section (106). The front section (106) connects to the intervening section (105) at seam (134a), and the intervening section (105) connects to the rear section (104) at seam (134b).

In the example of FIG. 3, the tank (102) includes a plurality of stiffener rings (130). Each stiffener ring (130) of FIG. 3 is mounted along an exterior perimeter of the tank (102) to reinforce the tank (102). The exterior perimeter of the tank (102) in FIG. 3 is the circumference along the outside surface of the tank wall (196). In the example of FIG. 3, stiffener rings (130c, 130d) are mounted adjacent to the seam (134a) formed between the front section (106) and the intervening section (105) of the tank (102). In addition, stiffener ring (130f) is mounted adjacent to the seam (134b) formed between the intervening section (105) and the rear section (104) of the tank (102). Having stiffener rings or other structural enhancers adjacent to the seams (134) of FIG. 3 strengthens the structural integrity of the tank (102) at those seams (134).

The tank (102) in the example of FIG. 3 also includes two baffles (136) for dampening the movement of the flowable material throughout the tank (102), but only one baffle (136a) is visible. Each baffle (136) of FIG. 3 is mounted along an interior perimeter of the tank (102) and spans an interior region of the tank (102). The interior perimeter of the tank (102) in FIG. 3 is the circumference along the inner surface of the tank wall. In FIG. 3, baffle (136a) is mounted adjacent to seam (134b) formed between the intervening section (105) and the rear section (104) of the tank (102). Similar to the stiffener rings, having the baffle (136b) adjacent to the seam (134b) of FIG. 3 strengthens the structural integrity of the tank (102) at that seam (134b).

To further reinforce the structural integrity of the tank (102) in the example of FIG. 3, the tank (102) includes two gussets (140). A gusset is a plate extending vertically away from the surface to which it is mounted and provides structural support to that surface on which it is mounted. In the example of FIG. 3, each gusset (140) is mounted to a bottom interior portion of the tank (102) and extends horizontally along the tank (102) as a single piece from the front section (106) into the rear section (104) to reinforce the tank (102). The gussets (140) of FIG. 3 are formed from a single piece of material such as, for example, metal because the structure formed from a single piece is often structurally stronger than a structure composed of multiple pieces fused together through welding or some other method. Each of the gussets (140) of FIG. 3 is made from a single piece of metal, typically steel, that is cut to fit along the bottom interior portion of the tank (102). Other materials or methods of making gussets useful in low-profile trailers according to embodiments of the present invention as will occur to those of skill in the art may also be useful.

In the example of FIG. 3, the gussets (140) do not extend along an entire length of the rear section (104). Rather, the gussets (140) only extend into the rear section (104) as far as the baffle (136a) that is mounted adjacent to the seam (134b) between sections (104, 105). Due to the fabrications techniques used to mount the gussets (140) to the tank (102), a point of weakness in the structure of the tank (102) is created wherever the gussets (140) terminate along the length of the tank (102). To reinforce the tank (102) at the point of weakness that is created by the gussets (140), the gussets (140) of FIG. 3 terminate at the baffle (136a), which provides structural reinforcement for the tank (102) generally and at the point that the gussets (140) terminate in the rear section (104). To reinforce the tank (102) at the point where the gussets (140) terminate in the front section (106) of the tank (102), the tank (102) includes a stiffener ring (130b) at the location where the gussets (140) begins extending from the front section (106) to the rear section (104).

While the exemplary tank (102) in the example of FIG. 3 includes the use of stiffener rings, baffles, and gussets, one of skill in the art will recognize that the use of these three components is for explanation, not for limitation. Other low-profile tank trailers according to embodiments of the present invention may or may not use any or all of these structural enhancements. Still further, other internal structural enhancements as will occur to those of skill in the art may also be useful such as, for example, cross-bar supports.

Figure 4:
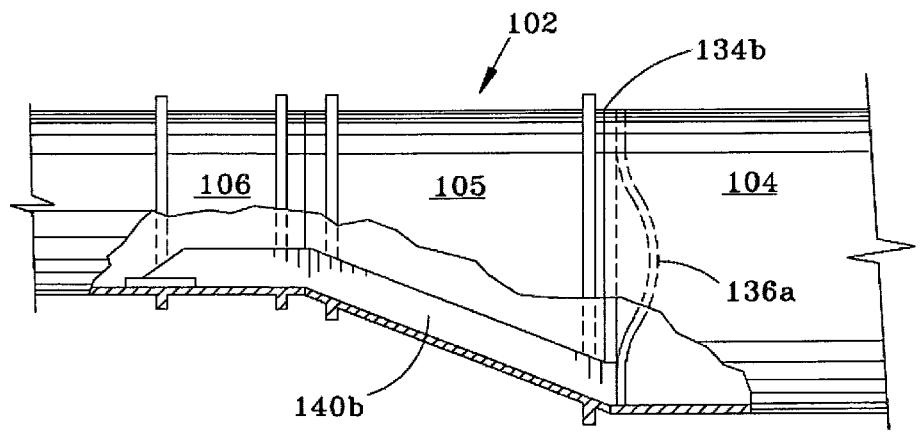
FIG. 4 sets forth a drawing illustrating a right orthogonal view of the frameless, self-supporting tank in the exemplary low-profile tank trailer according to embodiments of the present invention.

For further explanation regarding the placement of the gussets (140) in the exemplary tank (102) of FIG. 3, FIG. 4 sets forth a drawing illustrating a right orthogonal view of the frameless, self-supporting tank (102) in the exemplary low-profile tank trailer according to embodiments of the present invention. FIG. 4 shows a cut-away of the tank (102) to reveal the gusset (140b). The gusset (140b) of FIG. 4 is mounted to a bottom interior portion of the tank (102) and extends horizontally along the tank (102) as a single piece from the front section (106) into the rear section (104) to reinforce the tank (102). In the example of FIG. 4, the gusset (140b) does not extend along an entire length of the rear section (104). Rather, the gusset (140b) only extends into the rear section (104) as far as the baffle (136a) that is mounted adjacent to the seam (134b) between sections (104, 105).

Figure 5:
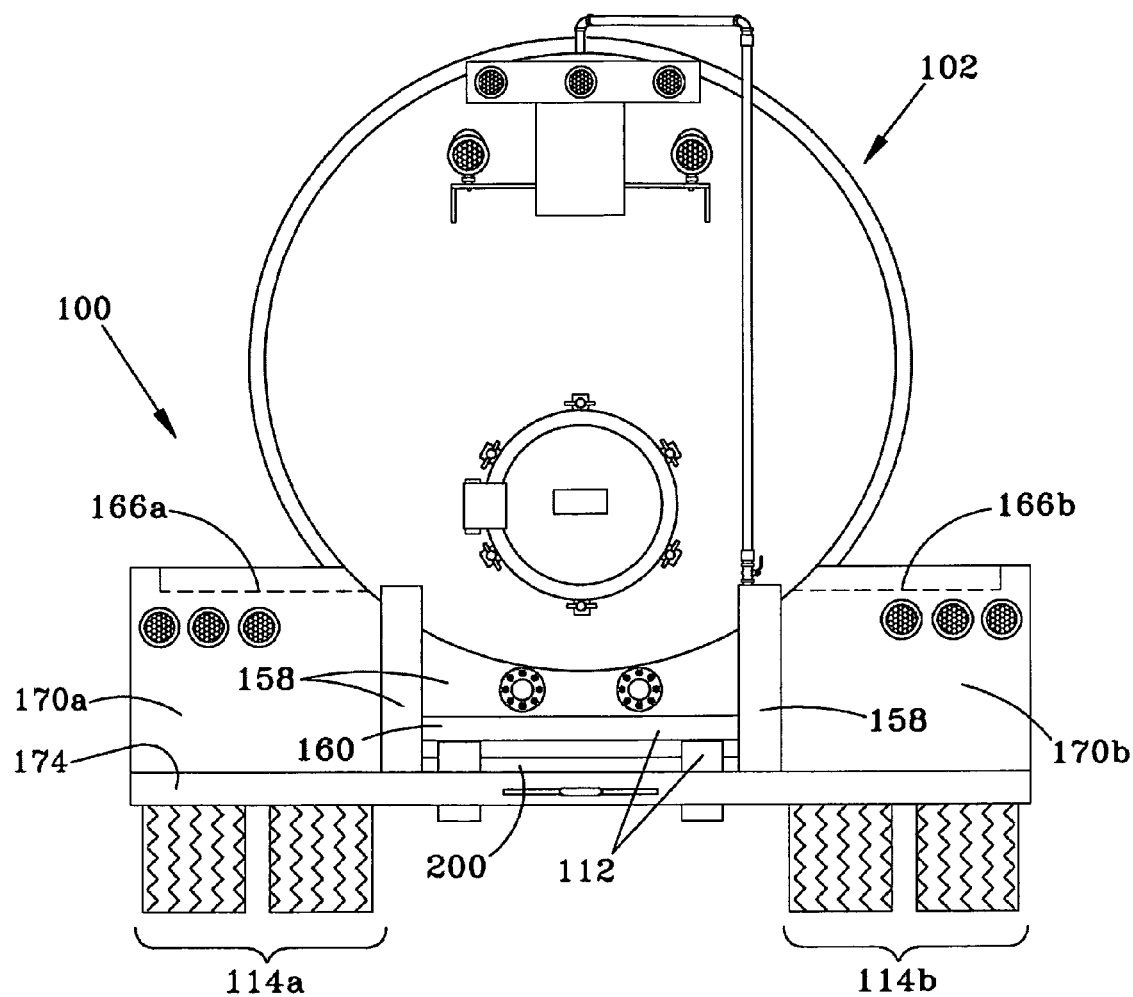
FIG. 5 sets forth a drawing illustrating a rear orthogonal view of the exemplary low-profile tank trailer according to embodiments of the present invention.

For further explanation of the exemplary tank trailer (100) according to embodiments of the present invention, FIG. 5 sets forth a drawing illustrating a rear orthogonal view of the exemplary low-profile tank trailer (100) according to embodiments of the present invention FIG. 5 depicts the hose trays (166) mounted longitudinally along the bottom, lateral portions of the rear section (104). The hose trays (166) of FIG. 5 are mounted lower than the underside of the front section, which allows a truck operator to easily access the hose trays (166) at the level of the operator's torso, rather than the more inconvenient and dangerous location of at or above the operator's head as with traditional trailers. In the example of FIG. 5, each hose tray (166) is formed from one or more metal sheets configured at substantially right angles—that is, approximately ninety degrees. Forming the hose trays (166) using substantially right angles reduces the bending, welding, or other fabrication technique required to configure a hose tray from metal sheets. The hose trays (166) depicted in FIG. 5 are configured using four right angles. Specifically, the hose tray (166b) is formed from a sheet that extends from the tank (102) to form a surface on which the hoses or other items rest. The sheet is then bent ninety-degrees counter-clockwise upward followed by three additional bends of ninety-degrees clockwise to form a lip and outside edge for the hose tray (166b). Similarly, the hose tray (166a) is formed from a sheet that extends from the tank (102) to form a surface on which the hoses or other items rest. The sheet is then bent ninety-degrees clockwise upward followed by three additional bends of ninety-degrees counter-clockwise to form a lip and outside edge for the hose tray (166a). One of skill in the art will recognize, however, that the configuration of the hose trays (166) in the example of FIG. 5 and as shown in the other Figures are for explanation only, not for limitation. Other configurations using substantially right angles may also be useful in low-profile tank trailers according to embodiments of the present invention.

FIG. 5 also depicts the rear walls (170) of the exemplary trailer (100). The rear walls (170) of FIG. 5 include mounting sockets for mounting rear signal indicators such as breaking and turning signal lights. The rear walls (170) of FIG. 5 are fabricated from sheets of metal, but other materials, such as fiberglass or carbon-fiber, as will occur to those of skill in the art may also be used. The rear walls (170) are aligned vertically with respect to the hose trays (166) and extend downward from the rear ends of the hose trays (166).

In the example of FIG. 5, the exemplary trailer (100) includes rear platforms (174) extending horizontally from the rear walls (170). As mentioned above, the rear platforms (174) of FIG. 5 are configured from a metal mesh to avoid the accumulation of liquids and debris, but such platforms (174) may be configured from metal plates with perforations, solid metal plates, or even other materials as will occur to those of skill in the art. In the example of FIG. 5, the rear platforms (174) are configured lower than the hose trays (166). The configuration depicted in FIG. 5 facilitates the ability of a truck operator to step up on the rear platforms (174) without the assistance of a ladder or additional steps.

In addition to the tank's overall shape, the exemplary low-profile tank trailer (100) described herein utilizes a low-ride suspension and low-profile tires to lower the trailer's center of gravity when compared to traditional tank trailers. The low-profile tank trailer (100) of FIG. 5 includes a low-ride suspension (112) that connects to the tank (102) through a tank substructure (158). The tank substructure (158) is mounted on top of the suspension (112), and in turn, the rear section (104) of the tank (102) is mounted to the tank substructure (158).

The low-profile tank trailer (100) of FIG. 5 also includes low-profile tires (114) operatively connected to the trailer suspension (112) through axle (200). To allow the tank (102) to rest as low as possible in the space between the tires (114), the axle (200) of FIG. 5 is generally the widest commercially available axle that complies with the regulations promulgated by the various authorities governing the width of trailers using the highway system. Such agencies may include a state's or federal government's department of transportation, public safety, highway administration, or any other such agency as will occur to those of skill in the art.

In the example of FIG. 5, the trailer suspension (112) includes a suspension frame (160) having a width that substantially matches the maximum width that provides a minimum clearance required for the tires (114). The minimum clearance required for the tires (114) is the minimum distance from any other structure on the trailer that the tires (114) should be operated. Typically, this distance is specified by the tire manufacturer but may be set by a governmental or other agency regulating such distances. By maximizing the width of the suspension (112), the tank substructure (158) is made wider, and the tank (102) is permitted to sit lower on the trailer (100), thereby lowering the trailer's center of gravity. In addition to ensuring the trailer suspension (112) is as substantially wide as possible without violating the minimum clearance needed for the tires (114), the suspension (112) is also configured to accommodate minimum clearances required for the axle (200).

The exemplary tank trailer depicted in FIGS. 1-5 is a vacuum trailer used to transport liquids. Accordingly, the tank of the exemplary trailer of FIGS. 1-5 is enclosed for containing such liquids. That is, all the points of ingress or egress into the space within the tank are blocked from the environment outside the tank by covers, valves, hoses, or the like so that the tank's contents are not exposed to the environment surrounding the tank. One of skill in the art, however, will recognize that the depiction of the enclosed tank in FIGS. 1-5 is for explanation only and not for limitation. In other embodiments according to the present invention, a tank may be open to the environment above the tank. For further explanation, therefore, FIG. 6 sets forth a drawing illustrating a left perspective view of another exemplary low-profile tank trailer (600) for transporting flowable material according to embodiments of the present invention.

Figure 6:
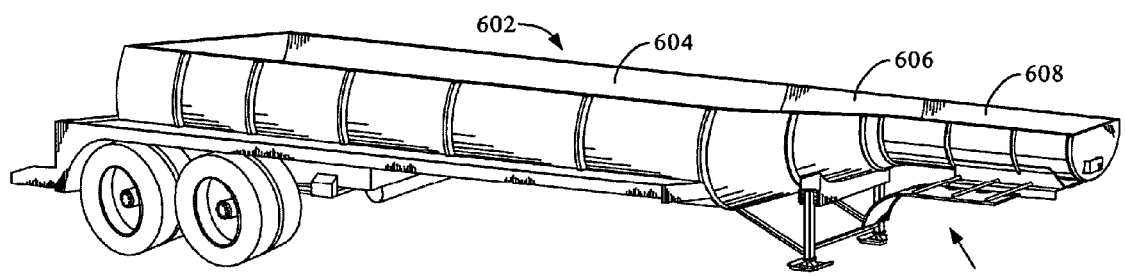
FIG. 6 sets forth a drawing illustrating a left perspective view of another exemplary low-profile tank trailer for transporting flowable material according to embodiments of the present invention.

The exemplary tank trailer (600) of FIG. 6 includes a low-profile tank (602) that is open to the environment above the tank (602). The low-profile tank (602) in the example of FIG. 6 has a rear section (604), a front section (608), and a transitional section (606) connecting the rear section (604) and the front section (608) such that flowable material can flow among the sections (604, 606, 608). In FIG. 6, the front section (608) has a diameter smaller than the diameter of the rear section (604), and the rear section (604) has a lower center of gravity than the center of gravity for the front section (608). The top side of the sections (604, 606, 608) are collinearly aligned, and the front section (608) and the transitional section (606) are frameless underneath. In FIG. 6, a trailer suspension is operatively connected to the rear section (604).

In the example of FIG. 6, the tank (602) is open to the environment above the tank (602) along the entire length of the tank (602). This opening allows the tank trailer (600) to be conveniently filled with flowable material from above the trailer (600). One of skill in the art will recognize that an open tank may be advantageous given that many types of flowable material such as, for example, gravel or sand, may be more readily loaded into the top of an open tank than through a port in an enclosed tank. Although the opening in the tank (602) of FIG. 6 extends along the entire length of the tank (602), such an embodiment is for explanation only, not for limitation. In other embodiments, the opening in the tank may only extend a portion of the tank's length. Still further, there may be multiple places along the top of a tank useful in trailers according to embodiments of the present invention that open the tank to the environment above the tank.

Based on the exemplary embodiment depicted in and described with reference to FIG. 6, one of skill in the art will recognize that exemplary trailers according to embodiments of the present invention are not limited to vacuum trailers. Other types of trailers may also be configured in accordance with embodiments of the present invention. Such tank trailers may include insulated trailers, hauling trailers, cargo trailers, or any other type of trailer having a configuration in accordance with embodiments of the present invention as will occur to those of skill in the art.

FIGS. 1-6 depict tanks useful in an exemplary low-profile tank trailer according to embodiments of the present invention that have circular cross-sections that vary in size along the length of the tank. One of ordinary skill in the art, however, will recognize that tanks used in low-profile tank trailers according to embodiments of the present invention may have cross-sections configured in a variety of shapes, including elliptical, rectangular, triangular, and so on. Still further, the shape of the cross-sections for tanks of trailers according to embodiments of the present invention may vary along the length of the trailer.

Figure 7:
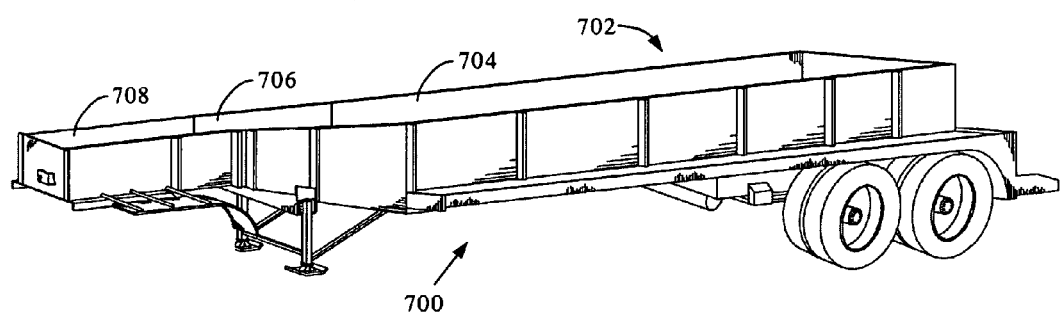
FIG. 7 sets forth a drawing illustrating a right perspective view of another exemplary low-profile tank trailer for transporting flowable material according to embodiments of the present invention.

For further explanation, FIG. 7 sets forth a drawing illustrating a right perspective view of another exemplary low-profile tank trailer for transporting flowable material according to embodiments of the present invention. The exemplary tank trailer (700) of FIG. 7 includes a low-profile tank (702) that has a generally rectangular cross-section and is open to the environment above the tank (702). The low-profile tank (702) in the example of FIG. 7 has a rear section (704), a front section (708), and a transitional section (706) connecting the rear section (704) and the front section (708) such that flowable material can flow among the sections (704, 706, 708). In FIG. 7, the front section (708) has a circumference smaller than the circumference of the rear section (704), and the rear section (704) has a lower center of gravity than the center of gravity for the front section (708). The top side of the sections (704, 706, 708) are collinearly aligned, and the front section (708) and the transitional section (706) are frameless underneath. In FIG. 7, a trailer suspension is operatively connected to the rear section (704).

While certain exemplary embodiments have been described in details and shown in the accompanying drawings, it is to be understood that such embodiments are merely illustrative of and not devised without departing from the basic scope thereof, which is determined by the claims that follow.

We claim:

1. A tank trailer for transporting a flowable material comprising:
 a vessel having three portions, a front portion, a transitional portion, and a rear portion, wherein the front portion has a first internal diameter, the rear portion has a second internal diameter, and the transitional portion has an third internal diameter in between the sizes of the first and second internal diameters, wherein the rear portion has:
 an inner surface;
 a partition, said partition comprising a first vertical portion and a second horizontal portion;
 the first vertical portion having a first edge that fixedly adjoins a partial portion of the inner surface of said rear portion, and a second edge;
 the second horizontal portion having a front edge, a rear edge, and side edges; said side edges fixedly adjoin a substantially horizontal portion of the inner surface of the rear portion, the read edge that fixedly adjoins a rear wall of the rear portion; and
 the second edge of first vertical portion fixedly adjoins the front edge of the second horizontal portion;
 a rear suspension fixture fixedly attached to the rear portion of the vessel;
 a rear axle fixedly attached to said suspension;
 a valve for ingress of flowable material communicating with an interior of the vessel;
 an exit valve for egress of flowable material from the interior of the vessel; and
 a kingpin fixedly attached for attaching said tank trailer to a truck rig.

2. The tank trailer of claim 1, wherein the rear axle comprising a dual axle further comprises low-profile wheels and tires.

3. The tank trailer of claim 1, wherein the rear suspension fixture is fixedly attached to a frame, which is fixedly attached to the rear portion of the vessel.

4. The tank trailer of claim 1, wherein the rear portion of the vessel further comprises said partition, said partition having an outer edge fixedly attached to the inner surface of the rear portion of the vessel for creating a void between said rear wall of the rear partition wherein no flowable material can enter said void.

5. The tank trailer of claim 1, wherein the first and second edges of the first vertical portion and the front, rear, and side edges of the second horizontal portions are fixedly adjoined through a weld.

6. The tank trailer of claim 1, wherein the valve is a side load valve for the ingress of flowable material.

7. The tank trailer of claim 1 wherein the valve is a side load valve for the ingress of flowable material.

8. The tank trailer of claim 1, wherein the valve is a top load valve for the ingress of flowable material.

9. The tank trailer of claim 1, wherein the valve is a top load valve for the ingress of flowable material.

10. The tank trailer of claim 1, wherein the rear portion of the vessel further comprises said partition, said partition comprising said first vertical portion having said first edge, wherein said partition fixedly adjoins said inner surface of the vessel with said first edge.

11. The tank trailer of claim 10, wherein the partition is substantially circular.

12. The tank trailer of claim 11, wherein an edge of the substantially circular partition is fixedly adjoined to the inner surface of said vessel through a weld.

13. The tank trailer of claim 1, wherein the rear portion further comprises a plurality of baffles fixedly adjoining the inner surface of the vessel for dampening of movement of said flowable material during transport of said flowable material.

\* \* \* \* \*